May 4, 1926. 1,583,643
F. W. BALL
ICE CREAM MOLD
Filed Feb. 2, 1924
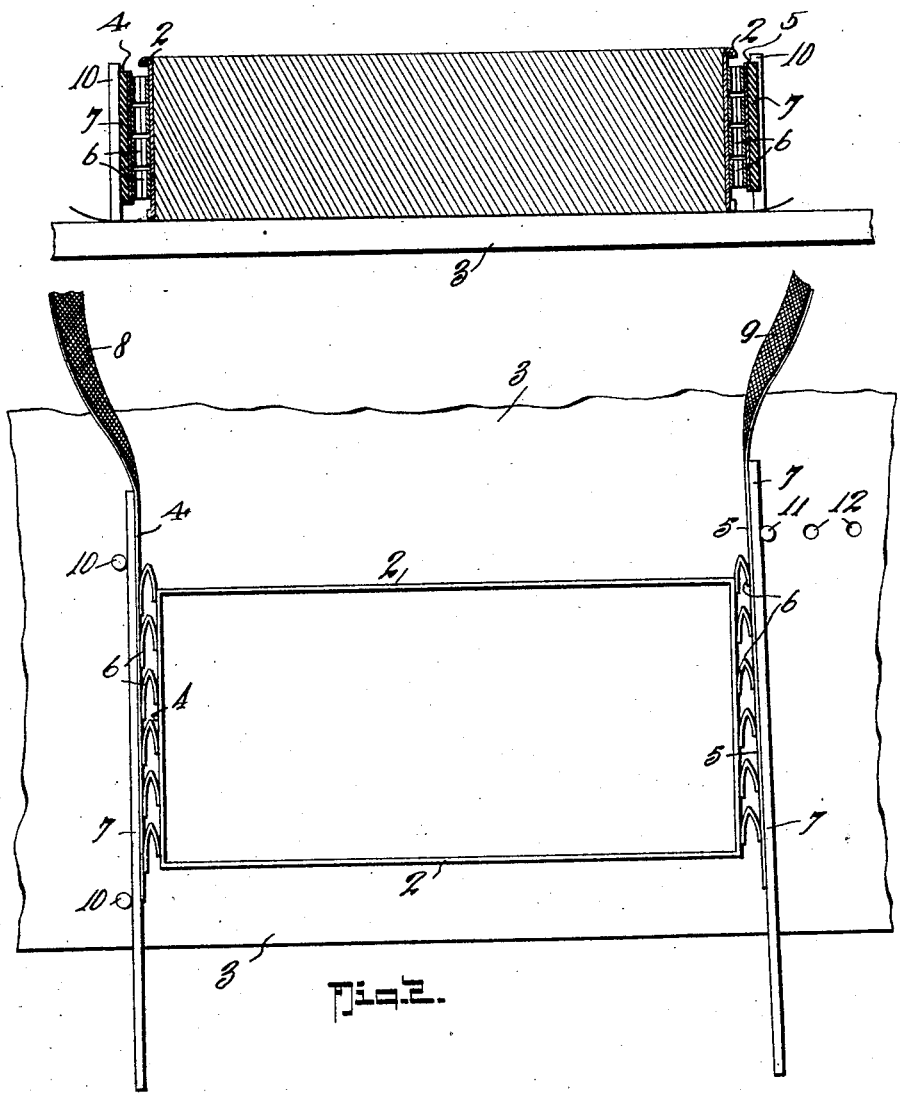
Inventor
Frederick W. Ball.
By Albert E. Dietrich
Attorney Patented May 4, 1926.

1,583,643

UNITED STATES PATENT OFFICE.

FREDERICK W. BALL, OF VANCOUVER, BRITISH COLUMBIA, CANADA, ASSIGNOR OF ONE-THIRD TO JAMES J. LOGAN, OF AGASSIZ, BRITISH COLUMBIA, CANADA, AND ONE-THIRD TO ROWLAND W. JENKINS, OF VANCOUVER, BRITISH COLUMBIA, CANADA.

ICE-CREAM MOLD.

Application filed February 2, 1924. Serial No. 690,324.

*To all whom it may concern:*

Be it known that I, FREDERICK W. BALL, a citizen of the United States, residing at Vancouver, in the Province of British Columbia, Canada, have invented certain new and useful Improvements in Ice-Cream Molds, of which the following is a specification.

This invention relates to a means for effecting release of a body of ice cream which has been frozen in a metal mold. When ice cream is prepared in the brick form, the material in a partially frozen condition is filled into a mold of thin sheet metal, such as tin plate, and in the mold is subjected to a zero temperature that will effect its freezing to the desired extent. Thereafter, the frozen block of ice cream is removed from the mold, usually by dipping the mold into hot water, thereby releasing the frozen material from the surface of the mold.

This method is open to many objections and is not considered either sanitary or convenient, and it is to provide a cleaner, quicker and more satisfactory method of releasing the frozen brick of ice cream from its mold, that the device, which is the subject of this application, has been devised.

In it the opposite ends of the metal mold are placed between the terminal contacts of an electric circuit in which a large current of relatively low voltage is maintained. This current, passing through the walls of the mold, immediately heats them to a sufficient extent to release the frozen material from them.

The means by which this result is attained is fully set forth in the following specification, reference being made to the drawings by which it is accompanied, in which:

Fig. 1 is a vertical section of the appliance, and

Fig. 2 is a plan of the same.

In these drawings 2 represents the walls of the mold, which may be of any suitable form, but is here shown as rectangular in plan and cross section. The material to be charged into the mold being partially frozen is sufficiently plastic that, as shown in the drawing, the bottom of the mold may be closed by the slab on which the mold is placed on a sheet of waxed paper; or, as is frequently the case, the mold may have an integral or removable bottom. These filled molds are placed in a refrigerating chamber, the temperature of which is reduced approximately to zero, under which exposure the material in the mold is frozen solid.

Each mold 2 enclosing its block of frozen ice cream is then placed on a slab 3 of non-conducting material between the terminals 4 and 5 of a circuit in which an electric current of from one thousand to five thousand amperes (according to the dimensions of the mold) is delivered, at a relatively low voltage of say approximately half a volt.

Each terminal 4 and 5 extends across an area of the sides or ends of the mold 2 and contact is made through a number of relatively small resilient contacts 6, so as to obtain a sufficient conducting area to deliver the considerable current without local heating of the contacts. The spring contacts 6 also adapt themselves to slight irregularities in the end faces of the mold.

The resilient contacts 6 may be applied in any convenient manner to the ends of the mold. In the drawing they are shown as secured to a handled backing 7 of non-conducting material and the circuit current delivered to them through flexible flat leads 8 and 9.

One of these terminals 4 is applied to the base slab 3 against two pins 10 in fixed position. The mold 2, containing its brick of frozen ice cream, is, as shown in the drawing, applied to the contacts of the terminal 4, and at the other end a pin 11 is inserted in one of the apertures 12 suitable to the length of the mold 2.

The other terminal 5 is then applied between the pin 11 and the mold and by the handled end its contacts 6 are pressed into engagement with the end of the mold.

The current passing through the walls of the box 2 between the terminals 4 and 5 quickly heats those walls to a sufficient extent to release the frozen brick of ice cream from them.

I do not desire to be confined to the particular manner herein shown and described of applying the contact terminals to the ends of the mold, as such may be varied within wide limits, and I regard the essential feature of the invention to be the application of a considerable current at a low voltage through the walls of metallic ice cream mold whereby those walls are heated and the frozen brick of ice cream released.

With this application the mold is quickly and uniformly heated, and the uniformity of the heating in itself hastens the process of removal; whereas in the present method of heating the mold with hot water, the heating cannot be done uniformly and as a consequence some parts of the brick are adherent to the mold, while the heat of the other parts of the mold is communicated to some depth in the material of the brick, and the table on which the work is performed becomes sloppy and insanitary, with a corresponding loss of material and imperfection in the form and condition of the molded brick.

Having now particularly described my invention, I hereby declare that what I claim as new and desire to be protected in by Letters Patent, is:

1. A means for freeing a body of ice cream from the walls of the mold in which it is frozen, said means comprising a base of non-conducting material on which the mold is set, an electric circuit adapted to carry a current of suitable strength and voltage to heat the mold when passed through its walls, said circuit including terminal contacts applicable to opposite sides of the mold on the base and each adapted to pass the current to the mold at the places of contact, fixed abutments on the base against which one of said circuit terminals lies, said base having an adjustable abutment against which the other circuit terminal is adapted to lie, whereby molds of different lengths may be manipulated, substantially as shown and described.

2. A means for freeing a body of ice cream from the walls of the mold in which it is frozen, said means comprising the combination with an electric circuit in which is a current of suitable strength and voltage to effect the heating of the mold, and means for connecting the terminals of that circuit to the opposite sides of the mold through a number of separated resilient contacts that will afford sufficient area for conveyance of the current without excessive heating at the places of contact.

3. A means for freeing a body of ice cream from the walls of the mold in which it is frozen, said means comprising a base of non-conducting material on which the mold is set, of an electric circuit adapted to carry a current of suitable strength and voltage to heat the mold when passed at uniform density through its cross section, said circuit having terminal contacts applicable to opposite sides of the mold on the base and each adapted to pass the current to the mold without excessive heating at the places of contact.

4. A means for freeing a body of ice cream from the walls of the mold in which it is frozen, said means comprising a base of non-conducting material on which the mold is set, of an electric circuit adapted to carry a current of suitable strength and voltage to heat the mold when passed at uniform density through its cross section, said circuit having terminal contacts applicable to opposite sides of the mold on the plate and each adapted to pass the current to the mold without excessive heating at the places of contact, and means for manually applying the terminal contacts to opposite sides of the mold.

5. A means for freeing a body of ice cream from the walls of the mold in which it is frozen, said means comprising a base of non-conducting material on which the mold is set, of an electric circuit adapted to carry a current of suitable strength and voltage to heat the mold when passed through it, said circuit having terminal contacts each adapted to pass the current to the mold without excessive heating at the places of contact, means for relatively permanently supporting one of the contacts on the base, and means for adjustably supporting the other terminal on the base that it may be manually pressed into contact with the mold and press the mold into contact with the contacts of the other terminal.

In testimony whereof I affix my signature.

FREDERICK W. BALL.